Dec. 24, 1968 H. C. A. VAN DUUREN 3,418,630

DOUBLE CHECK SIGNAL TEST SELF-CORRECTING COMMUNICATION SYSTEM

Filed Oct. 14, 1964 3 Sheets-Sheet 1

INVENTOR.
H. C. A. VAN DUUREN

BY Hugh A. Kirk

ATTORNEY

INVENTOR.
H. C. A. VAN DUUREN
BY Hugh A. Kirk
ATTORNEY

Dec. 24, 1968 H. C. A. VAN DUUREN 3,418,630

DOUBLE CHECK SIGNAL TEST SELF-CORRECTING COMMUNICATION SYSTEM

Filed Oct. 14, 1964 3 Sheets-Sheet 3

INVENTOR.
H. C. A. VAN DUUREN

BY Hugh [signature]

ATTORNEY

United States Patent Office 3,418,630

Patented Dec. 24, 1968

3,418,630
DOUBLE CHECK SIGNAL TEST SELF-CORRECTING COMMUNICATION SYSTEM

Hendrik Cornelis Anthony van Duuren, Wassenaar, Netherlands, assignor to De Staat der Nederlanden ten Deze Vertegenwoordigd Door de Directeur-Generaal der Posterijen, Telegrafie en Telefonie, The Hague, Netherlands Filed Oct. 14, 1964, Ser. No. 403,745
Claims priority, application Netherlands, Oct. 15, 1963, 299,277
10 Claims. (Cl. 340—146.1)

ABSTRACT OF THE DISCLOSURE

A system for self-correcting even transpositions in a balanced code character signal by generating two parity check signals in a different manner from a group or block of such multi-element binary code character signals at both a transmitting station and at a receiving station, and comparing the received first parity check signal with the regenerated one at the receiving station to determine if an error in the block has occurred, and if it has, determining which character signals of the block is in error. Thus the regenerated second check signal is used for locating which element or elements in the erroneous character signal is or are in error and correcting it or them. The first check signals are generated in end and center coupled feedback five stage shift registers and the second check signals are generated in only end coupled feedback five stage shift registers, all of which registers are fed via modulo two adders or counters. The receiving station has a storing shift register for each bit or element of all the character signals in the group or block, in which storing register the correction is made by quickly cycling it around to the located erroneous character, and correcting that character from a comparator circuit through modulo two adders. Clock pulse generators at each station and a five element divider at the receiving station control, through AND and OR gates, the check signal generators and the correction of the storing shift register by the comparator.

*Background of the invention*

The information contained in characters transmitted with a parity check or test signal is often transmitted in blocks and offered in the receiver to a device testing it by means of redundancy, e.g., in the form of parity tests. A widely used manner of handling such characters consists in employing a feedback shift register to which the signals of a block are successively applied. See "IRE Transactions on Information Theory," October 1961, pp. 234–244. "Error Correcting Codes and Their Implementation for Data Transmission Systems," by J. E. Meggitt. If there occurs no error in a block, the register will be in the initial, i.e., in the rest condition after the shifting. Errors in the block betray themselves in the final state, unless the errors cancel out, but a single error is always recorded.

Measurements of disturbance patterns on telegraph lines have taught that these lines are not particularly suited for applying self-correction, for in a few cases the rate of single mistakes did not exceed 60% of the total number of mistakes, whereas successive mistakes or very long bursts occurred with a rather large probability.

*Summary of the invention*

According to the invention the redundancy in the character is used for reducing correlation in the disturbance pattern, e.g., by means of a system for automatic requests for repetition, and only then the redundancy is used for self-correction. Such redundancy in the character is that of a balanced or constant ratio code. Thus the system of this invention is used in addition to and after an automatic RQ or correction and repetition system has been employed at each station for correcting each letter or character.

Both a transmitter and a receiver particularly suited for the purpose of self checking according to this invention avail themselves of groups of e.g., 30 letters of five elements or bits, plus ten check bits in two check letters, which check bits are generated on two parallel shift registers A and B, each of five stages in length. The first register A is a feedback one in order to form a maximum length series, namely of a length of 31 digits or bits, whose fundamental equation may be $0=1+T^3+T^5$. The horizontal parity check is obtained in the second register B, which is fully fed back from its input to its output.

Thus, in the system according to the invention, two check characters, i.e., 10 bits, are added to every block of 30 letters and every time a block is received, 31 of these characters are shifted into the A register and at the same time into the B register, with the 32nd character being shifted only into the B register. For this error correction purpose, the A register is shifted around five times per block and the B register is shifted around 32 times per block, so that 160 bits have been handled by the latter register after the reception of a block.

According to the invention, after an error has been detected at a receiver it is examined in both A and B registers in order to determine in which of the 30 letters this error has occurred, for which purpose the error patterns obtained are shifted in series of five through the A register until the patterns in the A register and the B register are identical. This shifting is effected by supplying zeros at a higher rate than the transmission rate to the A register at the end of each block. Thus with the aid of the first check character, the A register will reveal errors in a single letter of the block by an output differing from the normal state variations. By means of the second check character, this error can be corrected if only the number of the disturbed character is known. So after the detection of an error, this number can be found by shifting around the A register a number of times until the error patterns at the output terminals of the two registers A and B are identical. Then the said number of times indicates how many characters must be counted back in the block to find the disturbed character.

Accordingly it is an object of this invention in a telecommunication circuit system employing constant ratio code letters and shift registers for generating two different parity check signals, to correct transpositions of elements automatically in each letter, and/or up to five successive bit or element errors in any one letter or character.

*Brief description of the drawings*

The above and other features, objects and advantages, and a manner of attaining them are described more specifically below by reference to an embodiment of this invention shown in the accompanying drawings, wherein.

*Description of a preferred embodiment*

Figures 1, 3:
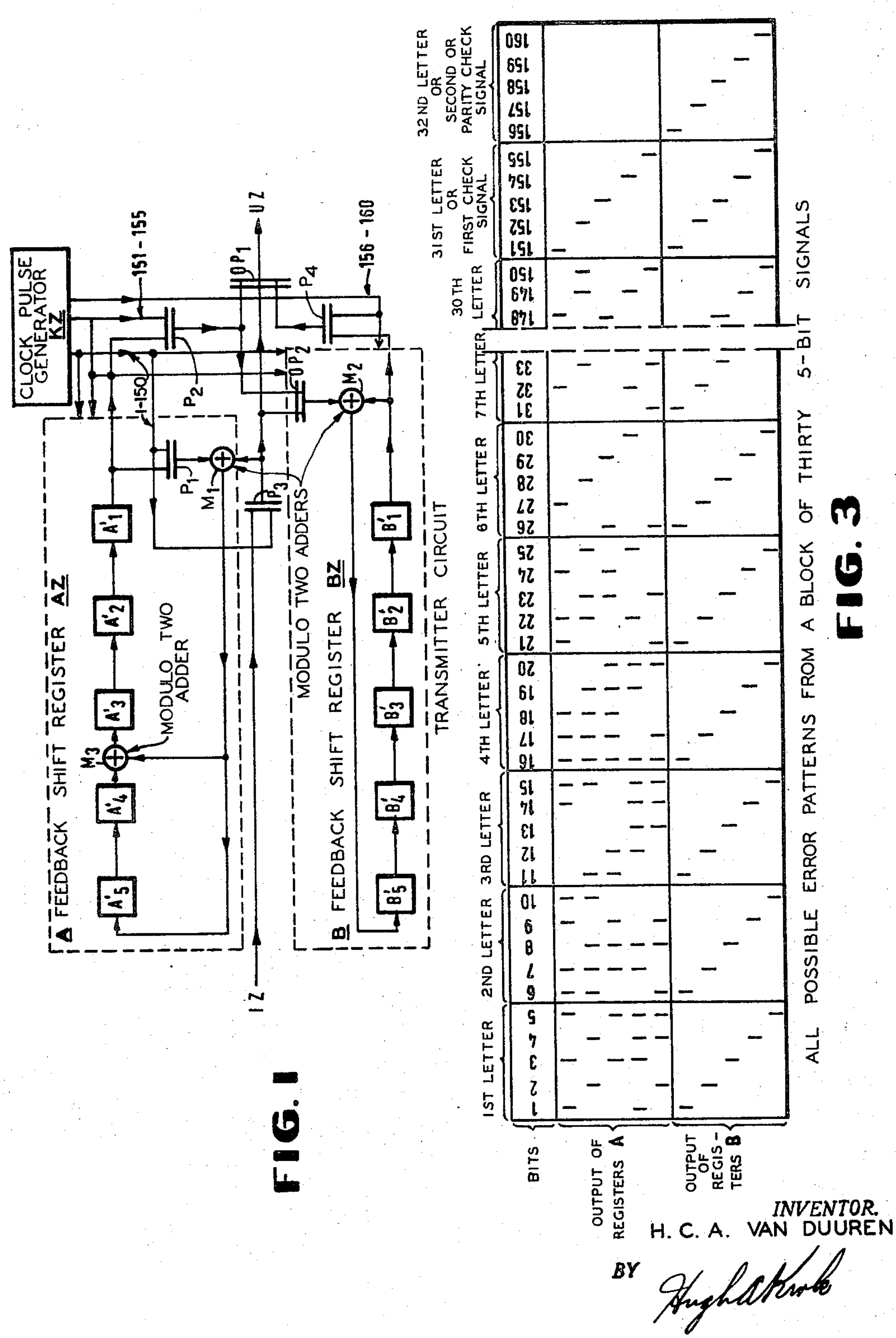
FIG. 1 is a schematic block wiring diagram of a circuit of two feedback shift registers A and B for generating two check signals in a transmitter according to a preferred embodiment of this invention.
FIG. 3 is a partial table of a group of all the possible error patterns which can occur in a block of 30 characters plus the two check signals generated from the block in each of the two shift registers A and B shown in FIGS. 1 and 2.

FIG. 1 shows the arrangement of a first feedback A register AZ for a maximum length series of 31 letters or characters, a second output-to-input feedback B register BZ, and the AND gates, modulo two adders and the output OR gate to the output terminal UZ.

Figure 2:
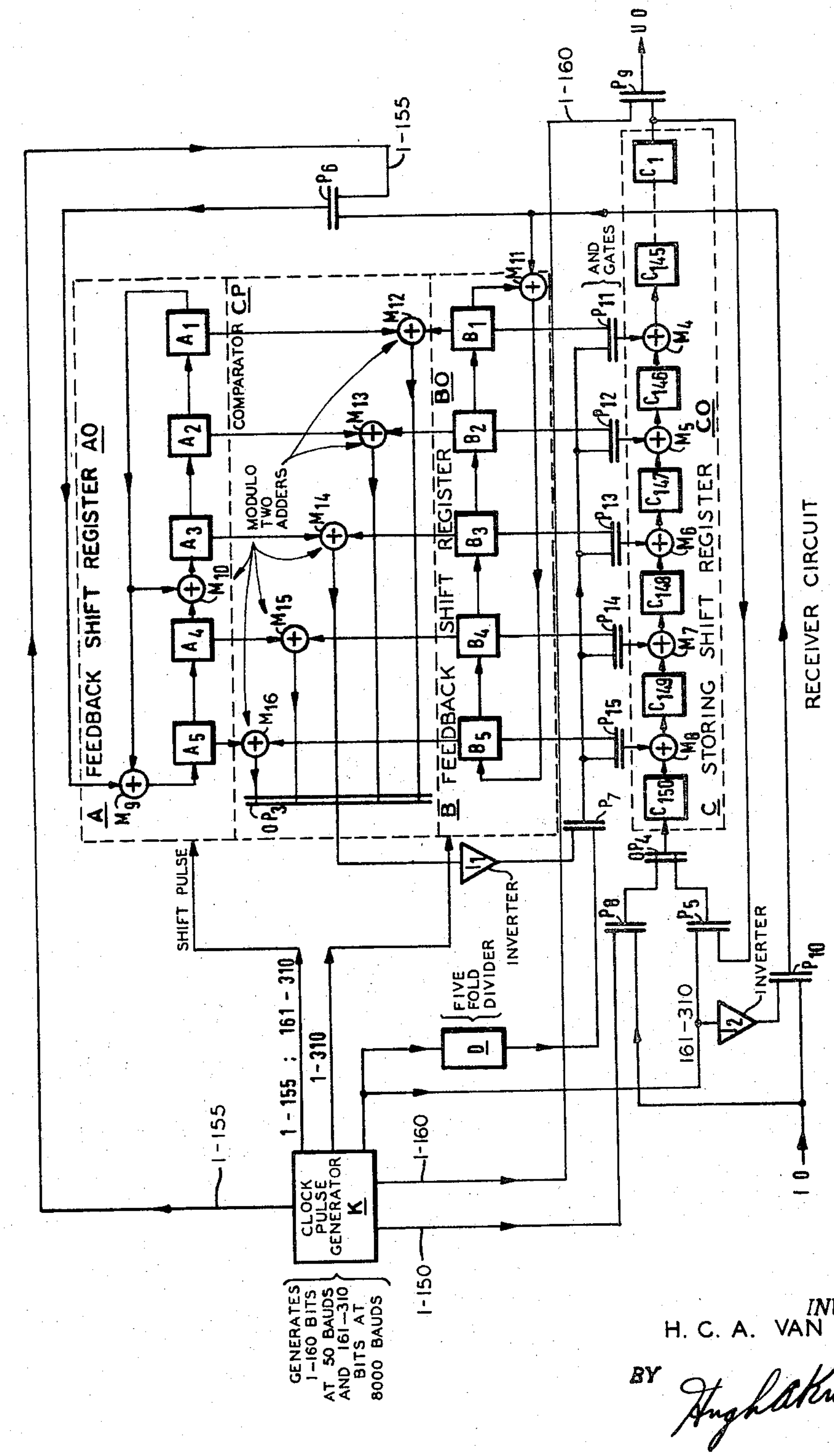
FIG. 2 is a schematic block wiring diagram of a circuit of two feedback shift registers A and B for the regeneration of the two check signals and comparing them with check signals received from the transmitter circuit according to that shown in FIG. 1, and also a signal block C storing shift register for all of the bits of all of the signals in a block, in which storing register an erroneous character may be automatically corrected.

In the diagrams of FIGS. 1 and 2, the modulo two adders which correspond to exclusive OR gates are indicated by plus signs placed in a circle; AND gates are represented by parallel lines and the reference letter P; and the inclusive OR gates are represented by parallel lines with terminals crossing one of these lines and connected to the other with the reference letter OP. In the transmitter circuit according to FIG. 1 the transmitter input terminal IZ is supplied with 30×5 information bits for the 30 letters of a block, and these bits arrive via the modulo two counter or adder M1 at the input terminal of the shift register AZ. If every group of five bits applied to the input IZ is accompanied by a start element and a stop element, these acompanied elements are suppressed. Between the stages A'3 and A'4 of the shift register AZ there is another modulo two adder M3, which receives the output of the register AZ and that of the stage A'4 and adds these outputs in order to pass them to the stage A'3. The AND gate P1 receives from the clock pulse generator KZ long pulses lasting from 1 through 150 bits, which determine the time during which the output of the register AZ is applied via the adder M1 to the input terminal of the register AZ. In the interval for bits 151 through 155, the output terminal of the register AZ is connected via the AND gate P2 and the OR gate OP1 to the transmitter circuit output terminal UZ. In the connection between the transmitter input terminal IZ and the input terminals of the modulo two adders M1 and M2, there is an AND gate P3 which is open for the duration of the bits 1 to 150. Thus the signals of the block are fed in at input IZ in FIG. 1 and reach the register AZ for forming the first check signal of the five check bits designated by the bits 151 through 155. In the connection between the output terminal of this AND gate P3 and the input terminal of the adder M2 there is an OR gate OP2. The input terminal of this OR gate OP2 is also connected to the output terminal of the AND gate P2 in order that the five digits of the first parity check signal, generated by the register AZ after the block of 30 characters have been shifted into it, will be passed to the register BZ also. This enables the register BZ to derive from the 30 information characters and the ensuing first check character, the second check signal or character to form the five bits 156 through 160 to be used for self-correction in the receiver.

At the output terminal UZ there arrives successively the 30×5 information bits, the bits 151–155 of the first check character from the register AZ via the gates P2 and OP1, and the bits 156–160 of the second check character from the register BZ via the gates P4 and OP1. These registers AZ and BZ are thus also shifted by corresponding pulses from the clock pulse generator KZ.

In FIG. 2 the receiver circuit contains the A and B feedback shift registers AO and BO corresponding to the feedback shift registers AZ and BZ in the transmitter of FIG. 1, respectively, with register AO being again a maximum length register for 31 bits. Furthermore, the receiver contains a third or block storing C register CO, in which, after the automatic correction, the block of 30 letters of 150 bits that is received will be stored in order to be shifted out to its destination via the output terminal UO during the shifting-in of the next block.

The signal from the output IZ of the transmitter in FIG. 1 which is delivered to the receiver in FIG. 2, arrives at the input terminal IO of this receiver. This input signal passes via the AND gate P10 to the input terminals of the A and B feedback shift registers AO and BO, and via the AND gate P8 and the OR gate OP4 to the block C storing shift register CO. This gate OP4 enables the block to be shifted completely around at a 160 times higher frequency during the 160th element, during bits 161 through 310 from the clock pulse generator K. At the same time during this 160th element the input terminals of the A and B register AO and BO may be blocked via the inverter I2 and the AND gate P10.

The clock pulse generator K delivers clock pulses 1 through 160 at the telegraph repetency of 50 bauds, and pulses 161 through 310 at a higher repetency, namely of 8,000 bauds, or 160 more pulses during the time for the 160th pulse at the first rate and control the shifting of the registers AO, BO and CO. The five-fold distributor or divider D, connected to the clock pulse generator K divides the pulses 161 through 310 in series of five equal bits.

(C) *Block error pattern from A and B feedback shift registers* (*FIG. 3*)

FIG. 3 shows a table of part of the bits 1 through 160 and their associated error patterns. The bits 1 through 5 constitute the first letter or character of a block, the bits 6 through 10 constituting the second, etc.

FIG. 3 thus shows the error patterns that may appear at the output terminal of the A shift register AO in the receiver in the case of errors in the characters 1 through 31 in a block, as well as the disturbance patterns appearing at the output terminal of the B register in the receiver in the case of disturbances occurring within the five elements 1 through 5 of a character not further specified in the block.

The full squares shown in the A register in FIG. 3, show in five successive columns of each five element character, all the possible error patterns that can occur in the five units code, notably 31. The 32nd pattern consists of five spacing elements and when such is found at the output terminals of the receiving register A, it means that a block shifted into the register does not contain any error. Thus five cycles of the maximum length A register contain 155 bits. The first six cycles of the block are shown in FIG. 3, but between the bits 33 and 148 a number of cycles have been left out.

Below the number for each bit is shown in the first five rows of square A, all the possible error patterns which can appear at the output terminal of the first or A feedback shift register AZ or AO in FIG. 1 or 2, if an error occurs in the character of the same number in that block. The lowest five rows represents the marking polarities appearing at the output terminals of the second or B feedback shift register BZ or BO in FIG. 1 or 2, if an error occurs in one of the elements 1 to 5 of some character of that block, or in the first check character of bits 151 through 155. The second check character of bits 156 through 160 indicates whether in the series of bits 1 through 155 an error has occurred in the first or in the fifth element or in an intermediate element of some character of this series. This second check signal or character is indicated in the right-hand bottom corner of this table in FIG. 3.

Because the A register AZ or AO produces a maximum length series of 31, the error patterns are repeated after the 31st bit, so that below the bit 32 the same error pattern is shown as below the bit 1. It is a peculiarity of this type of registers that an identical diagonal arrangement of marking elements is observed in the last character of bits 151 through 155 as occurs 32 times in the B register BZ or BO.

As regards the table of FIG. 3, the formation of the check elements of the first check character, the "1's" or vertical marks in the squares of the second row A of squares corresponding to the A registers, indicate the places where the marking elements have to be counted to yield, together with the first check element to be formed, an even number of marking elements. The same thing applies to each of the other five rows in the row of A squares.

The diagram in FIG. 3 also shows what error pattern is obtained at the output terminal of the shift register if one of the characters 1 to 31 of the block is disturbed. The 31st character only contains check bits. Thus it has been achieved that a disturbance of the element 1 causes at the output terminal the pattern shown below, consisting of 1 mark, 2 space, 3 space, 4 mark and 5 space; for the second element the pattern consists of 1 space, 2 mark, 3 and 4 space, 5 mark.

The bits of the block are fed in successively. For more clearness, however, this series of 155 bits is represented in a number of columns, viz., 31 columns of five.

The bits are fed into the registers AZ and BZ or AO and BO simultaneously. The B register, like the former, has a length 5 or 5 stages but each character of 5 elements drives it around once, and in each block it is driven around 32 times at the right end of FIG. 3. It shows that the shifting action of the A register stop at the end of the 31st character, i.e., after the 155th bit and that the last check character is only applied to the register B, so that for this register the numbering is extended by five bits.

If a block is correctly received the 32nd error pattern obtained at the output terminal of the register A must consist of five spacing elements and the same pattern must be obtained at the output terminal of the register B. The occurrence of a marking element in this register AO is indicative of the occurrence of an error in an element of a block, the number of which element is in error corresponds to the place of the marking element. Generally, the output terminal of the register A will not deliver the same error pattern. If an error has occurred in the first character of the block, the first element in register BO is a marking element, and the first and the fourth elements in the register AO will be marking elements (see the first column in the table of FIG. 3).

Thus, the receiving cycle is followed by a pause during which, by feeding in zeros, the register AO is shifted further until the error pattern obtained from the output terminal of the register AO is identical to that occurring at the output terminal of the register BO, or in this example, an amount corresponding to a series of five characters, or only after 31 shifts when a pattern is obtained in which only the first element is a marking element. Accordingly the error turns out to have occurred in the 31st character which is the first check character itself. The character can now be corrected by adding the error pattern modulo two to what is recorded for this character in the register BO which is the same as that in register AO.

Figure 4:
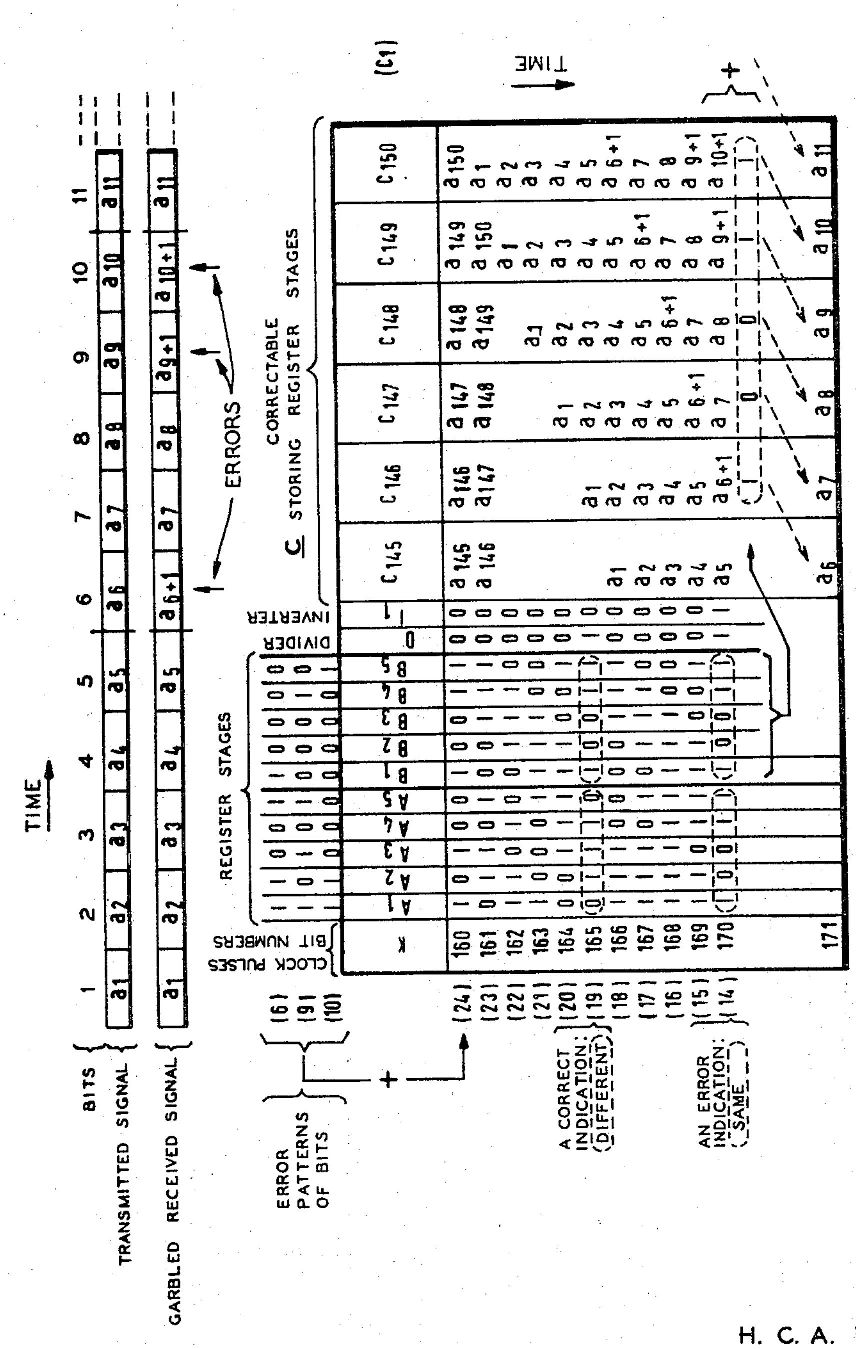
FIG. 4 is a time diagram of part of the signals in a block, some of which have errors, and how these errors are detected and corrected according to the check signals compared in the receiver circuit of FIG. 2.

(D) *Self correcting function* (*FIGS. 2 and 4*)

The adders M12 through M16 from a comparator circuit CP to compare the bits stored in the register units or stages A1 through A5 with those stored in the register units or stages B1 through B5. If they are identical, all these adders M12 through M16 deliver zeros to the OR gate OP3, which, in that case, applies a "1" to the AND gate P7 via the inverter I1. If at the same time a "1" is supplied by the distributor or divider D, the AND gate P7 delivers a "1" to all the AND gates P11 to P15, so that the relevant bits in stages B1 through B5 are transferred to the adders M4 to M8, in order to be added through the contents of the register units or stages C146 to C150 and stored in the register units or stages C145 through C149, thereby correcting the erroneous letter or character which was rotated to be in these stages at this time.

On the other hand if some of the bits stored in the register units or stages A1 to A5 are not identical to the bits contained in the units or stages B1 to B5, this self-correction takes place during the 160th step.

This self correcting function is illustrated in FIG. 4, in the uppermost row of which it is assumed that a number of signals or characters *a*1 to *a*5, *a*6 to *a*10, etc. has been transmitted (only the first two being fully shown); below it is shown that after the reception, the elements *a*6, *a*9, *a*10 turn out to be distorted to *a*6+1, *a*9+1, *a*10+1.

The error patterns delivered by the register AO in the case of these several errors in bits (6), (9), and (10) are indicated in parentheses behind the bracket at the top of the largest rectangular table in FIG. 4. Behind the clock pulse 160 the resulting contents of the register A are shown, as well as the resulting contents of the register BO. At the left the diagram there are shown in parentheses the corresponding steps (24) through (14) of the register AO and at the right of them the corresponding rows of bits of the error patterns. During the high repetency clock pulses 160 to 170, register AO is pulsed round, as well as the register BO, until, at the pulse 170 the error patterns obtained from the output terminals turn out to be identical which indicates the error.

The last part of FIG. 4 shows the contents of the corresponding stages of the C storing register CO, which is modified in successive steps until it is ready to yield-after the addition to the identical error, pattern eventually obtained from the registers A and B—the corrected five bit signal *a*6 through *a*10 at the 170th step.

While there is described above the observed principles of this invention in connection with specific apparatus, it is to be clearly understood that this description is made only by way of example and not as a limitation to the scope of this invention.

What is claimed is:

1. A self correcting telecommunication system for predetermined blocks of multi binary element code signals, comprising— at a transmitter station:

(a) a first feedback shift register means AZ for generating a first check signal for each block, (b) a second feedback shift register means BZ for generating a second check signal for that block and said first check signal, (c) means P2 for transferring said first check signal from the output of said first feedback shift register means to the input of said second feedback shift register means, (d) means P3 for transferring all the signals forming each block to the inputs of said first and said second register means simultaneously; and (e) a first clock pulse generator KZ for controlling the said transfer operations and for controlling the shifting of said first and second feedback register means; and at a receiver station:

(f) a third feedback shift register means AO corresponding to said first shift register means for regenerating the first check signal, (g) a fourth feedback shift register means BO corresponding to said second shift register means for regenerating the second check signal, (h) a fifth shift register means CO for storing each element of each message signal in one block, (i) means P8, P10, P6 for transferring all said received signals in each block to the inputs of said third, said fourth, and said fifth register means simultaneously as said signals are received, (j) a comparator means CP between said third and fourth shift register means for comparing the received and generated check signals and correcting any erroneous signal in said fifth shift register means according to said fourth shift register means, and (k) a second clock pulse generator K for controlling the shifting of said third, fourth, and fifth shift register means.

2. A system according to claim 1 including:

(i) a divider means D controlled by said second clock pulse generator to control the correction in said fifth shift register means by said comparator means.

3. A system according to claim 1 wherein each said multi-element code signal has five elements, and said first, second, third and fourth shift register means are each registers of five stages.

4. A system according to claim 3 wherein said first and third shift register means are center and end back coupled to provide a maximum length series of 31.

5. A system according to claim 3 wherein said second and fourth register means are solely and fully back coupled.

6. A system according to claim 1 wherein said comparator means comprises modulo two adders between each of the corresponding stages of said third and fourth register means, each of which modulo two adders are connected to an OR gate for controlling said fifth register for correcting the signals therein.

7. A system according to claim 1 wherein said second clock pulse generator regenerates all the clock pulses for one block of signals during the last pulse for each block for rotating said fifth shift register means and operating said comparator means.

8. A system according to claim 1 including modulo two adders at the inputs of said first, second, third and fourth register means.

9. A system according to claim 1 wherein (said first and second register means and said third and fourth register means are so connected to produce a block of 160 elements for) each of said blocks consists of 160 elements composed of thirty message signals of five elements each and two check signals of five elements each.

10. A system according to claim 1 wherein the inputs of each of said register means comprises an AND gate controlled by pulses from their associated clock pulse generators.

References Cited

UNITED STATES PATENTS

| | | | |
|---|---|---|---|
| Re. 23,028 | 8/1948 | Moore et al. | 178—23 |
| 2,153,737 | 4/1939 | Spencer | 178—69 |
| 2,653,996 | 9/1953 | Wright | 178—23 |
| 2,703,361 | 3/1955 | Van Duuren | 250—8 |
| 2,706,215 | 4/1955 | Van Duuren | 178—2 |
| 3,078,443 | 2/1963 | Rose | 340—146.1 |
| 3,159,810 | 12/1964 | Fire | 340—146.1 |
| 3,137,839 | 6/1964 | Rubin | 340—146.2 |
| 3,222,643 | 12/1965 | Klinkhamer | 340—146.1 |

OTHER REFERENCES

W. W. Peterson and D. T. Brown, Cyclic Codes for Error Detection, Proceedings of the IRE, January 1961, pp. 228–235. (Copy in Group 236.)

MALCOLM A. MORRISON, *Primary Examiner.*

C. E. ATKINSON, *Assistant Examiner.*

U.S. Cl. X.R.

178—23

UNITED STATES PATENT OFFICE

CERTIFICATE OF CORRECTION

Patent No. 3,418,630 December 24, 1968

Hendrik Cornelis Anthony van Duuren

It is certified that error appears in the above identified patent and that said Letters Patent are hereby corrected as shown below:

Column 1, lines 17 and 21, cancel "parity", each occurrence; line 53, "244." should read -- 244: --. Column 3, line 32, after "OP." insert the following paragraph and italicized heading (A):

In FIGS. 1 and 2 the above mentioned A and B registers AZ, BZ, and AO, BO each include five blocks A'1 through A'5, B'1 through B'5, and A1 through A5, B1 through B5, respectively, one block being shown for each stage of each register. These registers also include their associated modulo two adders M1 and M3 in register AZ, adder M2 in register BZ, adder M9 in register AO, and adder M11 in register BO. The register AZ also includes the AND-gate P1 in the feedback circuit, and the register BZ also includes its input OR-gate OP2.

(A) Transmitter circuit (FIG. 1)

same column 3, line 32, "In the" should appear as the beginning of a new paragraph; line 58, "In the connection" should appear as the beginning of a new paragraph; line 64, cancel "parity". Column 4, between lines 2 and 3, insert as an italicized heading -- (B) Receiver circuit (FIG. 2) --. Column 5, line 34, before "B" insert -- latter --; line 37, "at" should read -- . At --; same line 37, ". It" should read -- , it --; line 38, "register" should read -- registers --; line 40, "register B" should read -- B registers --; line 41, "this register" should read -- these B registers --; same line 41, after "bits" insert -- 156 through 160 --; line 42, "If" should read -- Accordingly if --; same line 42, after "received" insert a comma; line 43, "A" should read -- AO --; line 45, "B" should read -- BO --; line 46, "The" should read -- However, the --; line 72, "from" should read -- form --. Column 8, line 6, beginning with "(said first" cancel all to and including "elements for)" in line 8, same column 8.

Signed and sealed this 17th day of March 1970.

(SEAL)
Attest:

EDWARD M.FLETCHER,JR.
Attesting Officer

WILLIAM E. SCHUYLER, JR.
Commissioner of Patents